N. Granger,
Glass Furnace.
Nº 80,623. Patented Aug. 4, 1868.

Witnesses:

Inventor:

United States Patent Office.

NILES GRANGER, OF SARATOGA, NEW YORK.

Letters Patent No. 80,623, dated August 4, 1868.

IMPROVED GLASS-FURNACE.

*The Schedule referred to in these Letters Patent and making part of the same.*

TO ALL WHOM IT MAY CONCERN:

Be it known that I, NILES GRANGER, of Saratoga, in the county of Saratoga, and State of New York, have invented a new and useful Improvement in Glass-Furnaces; and I do hereby declare that the following is a full, clear, and exact description thereof, which will enable those skilled in the art to make and use the same, reference being had to the accompanying drawings, forming part of this specification.

This invention relates to a new and useful improvement in the manufacture of glass, whereby much valuable time and labor are saved.

And the invention consists in providing a peculiarly-constructed melting-pot, whereby I am enabled to melt and blow glass without intermission, and by which improved melting-pot I pursue a perpetual glass-melting and blowing-process, the construction of which pot and operation I will proceed to describe.

Similar letters of reference indicate corresponding parts.

Figure 1:
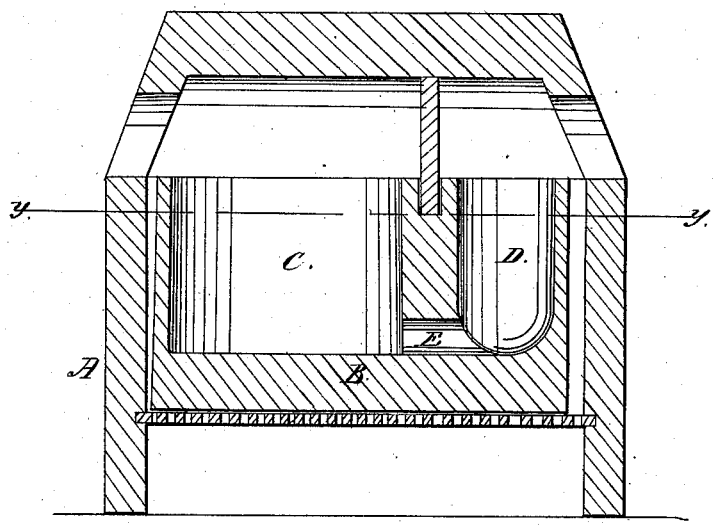
Figure 1 represents the melting-pot in a properly-constructed furnace as when ready for use, the same being a sectional elevation through the line $x\ x$ of fig. 2.
Figure 2:
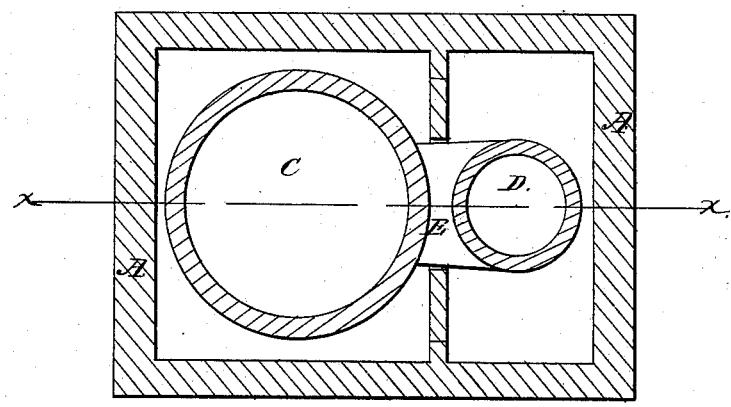
Figure 2 is a horizontal section through the line $y\ y$ of fig. 1.

A represents the furnace or wall which surrounds the melting-pot.

This furnace may be of any convenient size and form, and made of any suitable material.

B represents the melting-pot, formed substantially as seen in the drawing, with two compartments, C and D, with a connection between them, as seen at E.

F represents the fire-box.

The melting-pot is supported in any suitable manner in the furnace.

The method of operation is as follows:

In the first place, the pot is filled with broken glass and melted.

This glazes over the pot and protects it from the effects of the flux which is combined with the material to be afterwards used.

Then the larger portion of the pot C is filled with the material for making glass, and as this melts in the larger portion, C, the melted glass sinks down to the bottom and rises up in the small portion of the pot, D, from whence it is "worked" or blown.

The melted glass which thus rises in the part D is pure glass, or free from the foreign matter or impurities which have hitherto been so great an impediment in good glass-making, as those impurities remain in and float in the large portion C.

By this method the danger of breaking the working-pot by a large body of melted glass is avoided.

The material may be fed on to the portion C, for melting, constantly, or as fast as necessary, while the pure melted glass is being worked or blown from the smaller part D.

In this manner the operation of melting and blowing simultaneously may be kept up, without intermission, for any desired length of time.

The main fire or heat is applied to the larger part, C, but the products of combustion are passed beneath the part D, through properly-constructed flues, when the heat is so controlled as to keep the smaller part, with its contents, at the proper temperature.

Having thus described my invention, I claim as new, and desire to secure by Letters Patent—

The pot B, formed of the parts C and D, connected by the passage-way E, and operating substantially as and for the purposes described.

NILES GRANGER.

Witnesses:
THOMAS PRESTON,
CHARLES GRANGER.